United States Patent
Nagata

(10) Patent No.: US 10,585,565 B2
(45) Date of Patent: Mar. 10, 2020

(54) INFORMATION PROCESSING APPARATUS, INFORMATION PROCESSING METHOD AND STORAGE MEDIUM FOR AUTHENTICATING USER LOGIN AND SCREEN CUSTOMIZATION

(71) Applicant: Tadashi Nagata, Kanagawa (JP)

(72) Inventor: Tadashi Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 510 days.

(21) Appl. No.: 15/034,896

(22) PCT Filed: Dec. 9, 2014

(86) PCT No.: PCT/JP2014/083067
§ 371 (c)(1),
(2) Date: May 6, 2016

(87) PCT Pub. No.: WO2015/088036
PCT Pub. Date: Jun. 18, 2015

(65) Prior Publication Data
US 2016/0274753 A1    Sep. 22, 2016

(30) Foreign Application Priority Data

Dec. 11, 2013  (JP) ................. 2013-255641

(51) Int. Cl.
| | |
|---|---|
| *G06F 3/0484* | (2013.01) |
| *G07F 17/26* | (2006.01) |
| *G06F 21/82* | (2013.01) |
| *G06F 21/31* | (2013.01) |

(52) U.S. Cl.
CPC ............ *G06F 3/0484* (2013.01); *G06F 21/31* (2013.01); *G06F 21/82* (2013.01); *G07F 17/266* (2013.01)

(58) Field of Classification Search
CPC ...... G06F 3/048; G06F 21/31; G06F 9/44505; G07F 17/266
See application file for complete search history.

(56) References Cited

U.S. PATENT DOCUMENTS

| | | |
|---|---|---|
| 6,275,225 B1 | 8/2001 | Rangarajan et al. |
| 6,651,168 B1 | 11/2003 | Kao et al. |

(Continued)

FOREIGN PATENT DOCUMENTS

| | | |
|---|---|---|
| EP | 0548869 | 6/1993 |
| EP | 2128756 | 12/2009 |

(Continued)

OTHER PUBLICATIONS

Extended European Search Report dated Oct. 21, 2016.
(Continued)

*Primary Examiner* — Joy M Weber
(74) *Attorney, Agent, or Firm* — IPUSA, PLLC

(57) ABSTRACT

An information processing apparatus includes a storage unit that stores, associating with first identification information of a first program, which causes the information processing apparatus to function as a display control unit that displays a screen and to function as a process control unit that executes a process according to an input to the screen, information indicating whether there is a change in the screen and whether there is a change in the process; and a request unit that requires, when there is a change in the screen, a second program related to second identification information associated with the first identification information and stored in the storage unit, to display a changed screen, and that requires, when there is a change in the process, a third program related to third identification information associated with the first identification information and stored in the storage unit, to execute a changed process.

8 Claims, 16 Drawing Sheets

(56) References Cited

U.S. PATENT DOCUMENTS

| | | | |
|---|---|---|---|
| 7,890,506 | B2 | 2/2011 | Hirota |
| 8,656,287 | B2 | 2/2014 | Mori |
| 8,719,711 | B2 | 5/2014 | Katsumata et al. |
| 2001/0030660 | A1* | 10/2001 | Zainoulline ......... G06F 3/04812 715/720 |
| 2005/0160280 | A1* | 7/2005 | Caslin ..................... G06F 21/55 713/189 |
| 2008/0148297 | A1* | 6/2008 | Matsui ................ G06F 9/44521 719/328 |
| 2009/0094539 | A1 | 4/2009 | Wang et al. |
| 2009/0210934 | A1 | 8/2009 | Innes |
| 2014/0341447 | A1* | 11/2014 | Cho ................. G06K 9/00087 382/124 |
| 2015/0150117 | A1* | 5/2015 | Uruma ................... G06F 21/31 726/16 |

FOREIGN PATENT DOCUMENTS

| | | |
|---|---|---|
| JP | H03-189819 | 8/1991 |
| JP | 2005-031995 | 2/2005 |
| JP | 2009-054027 | 3/2009 |
| JP | 2009-059363 | 3/2009 |
| JP | 2011-233017 | 11/2011 |

OTHER PUBLICATIONS

"Displaymanager › Wiki › ubuntuusers.de", Dec. 3, 2013, XP055310289, Retrieved from the Internet: URL:https://wiki.ubuntuusers.de/Displaymanager/a/revision/663412/ [retrieved on Oct. 13, 2016], p. 1-p. 2.

"How to Use PAM to Configure Authentication on an Ubuntu 12.04 VPS DigitalOcean", Oct. 3, 2013, XP055310307, Retrieved from the Internet: URL:https://www.digitalocean.com/community/tutorials/how-to-use-pam-to-configure-authentication-on-an-ubuntu-12-04-vps [retrieved on Oct. 13, 2016], p. 1-p. 4.

Vipin Samar ED—Association for Computing Machinery: "Unified login with pluggable authentication modules (PAM)", 3rd. ACM Conference on Computer and Communications Security. New Delhi, Mar. 14-16, 1996; [ACM Conference on Computer and Communications Security], New York, ACM, US, Jan. 1, 1996, pp. 1-10, XP058199206, DOI: 10.1145/238168.238177 ISBN: 978-0-89791-829-9, abstract.

Japanese Office Action for 2013-255641 dated Jul. 25, 2017.

Ryushi Otake, LPIC drill useful in practice(4): The Mechanisms and Settings of X Window System (1/4)—@IT, Jul. 31, 2008, URL, http://www.atmarkit.co.jp/articles/0807/31/news132.html (With English Partial Translation).

Noriyuki Kitaura, How to Change Shell, on Jun. 21, 2001, URL, http://www.atmarkit.co.jp/flinux/rensai/linuxtips/106chgshell.html (With English Partial Translation).

Fumiyasu Sato, Using PAM for Authentication, Jun. 21, 2000, URL, http://www.atmarkit.co.jp/flinux/samba/sambatips02/sambatips02.html (With English Partial Translation).

International Search Report dated Feb. 3, 2015 in PCT/JP2014/083067 filed on Dec. 9, 2014.

\* cited by examiner

FIG.8

| FUNCTION NAME: AUTHENTICATION | APPLICATION NAME: A_APLI | SCREEN CUSTOMIZATION: ON | PROCESS CUSTOMIZATION: OFF |

FIG.14
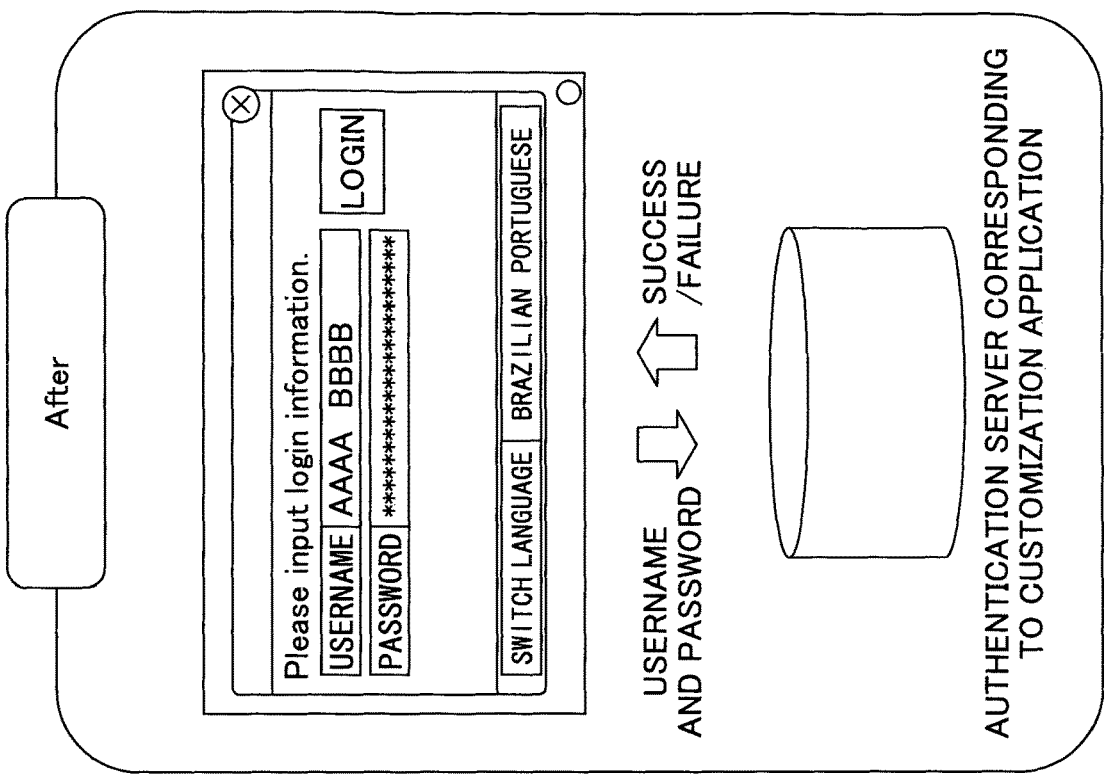
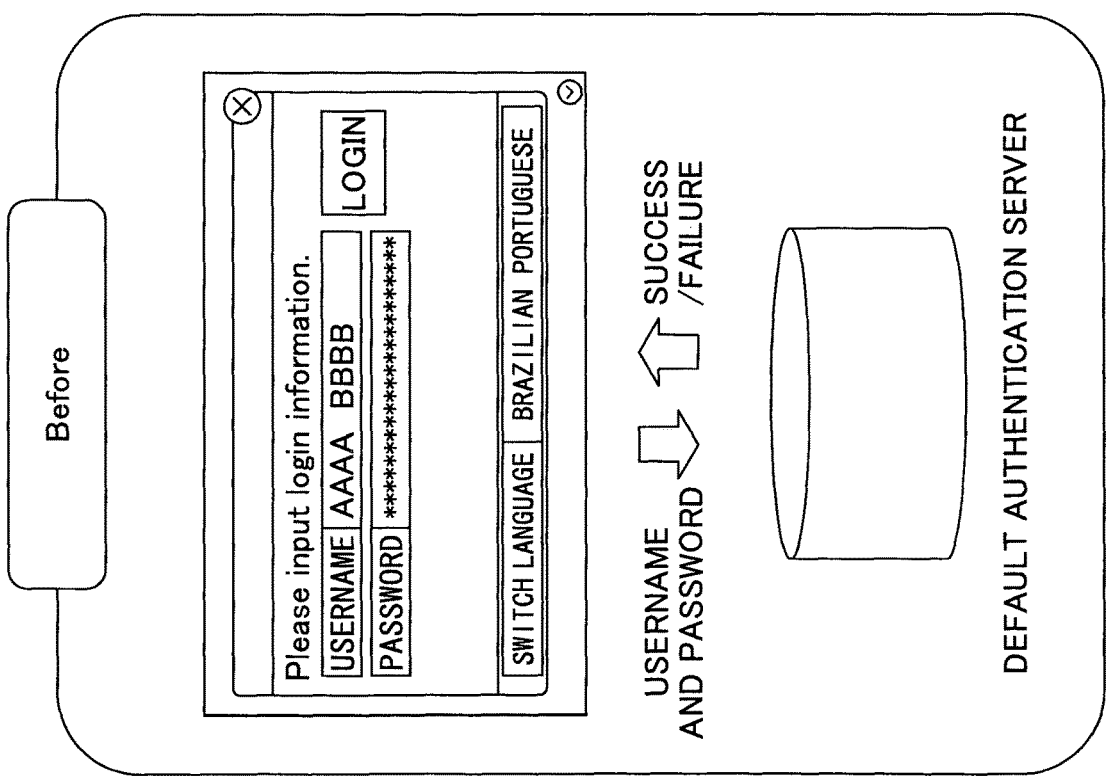

INFORMATION PROCESSING APPARATUS, INFORMATION PROCESSING METHOD AND STORAGE MEDIUM FOR AUTHENTICATING USER LOGIN AND SCREEN CUSTOMIZATION

TECHNICAL FIELD

The present invention relates to an information processing apparatus, an information processing method and a storage medium.

BACKGROUND ART

Conventionally, each of programs implemented in information processing apparatuses which execute processes in response to results of conversation with users includes a part for executing a process of displaying a screen that realizes conversation with a user (hereinafter referred to as a "display control part") and a part for executing a process in response to an input to the screen (hereinafter referred to as a "process control part").

For example, Patent Document 1 discloses a means for installing customized UI (User Interface) parts in a system, UI parts of an existing system, and a mechanism for replacing the existing UI parts by the customized UI parts.

Furthermore, Patent Document 2 discloses a mechanism for requesting by a driver for a peripheral device installed in an existing system, and installing a UI necessary for implementing a function of the driver in a unit of the UI element.

CITATION LIST

Patent Literature

Patent Document 1: Japanese Published Patent Application No. 2009-059363; and
Patent Document 2: Japanese Published Patent Application No. 2005-031995.

DISCLOSURE OF INVENTION

Problem to be Solved by the Invention

For example, if independency in customizing the display control part and the process control part for the existing program installed in the information processing apparatus is enhanced, efficiency in customizing the program can be improved. That is, in the related art, since the process control part of the existing program cannot be used for the process executed in response to the input to the screen, the efficiency in changing the process of displaying the screen cannot be improved. In the same way, since the display control part of the existing program cannot be used for the process of displaying the screen, the efficiency in changing the process in response to the input to the screen cannot be improved.

In view of the above subject matter, it is a general object of at least one embodiment of the present invention to provide an information processing apparatus, an information processing method and a storage medium that obviate one or more problems caused by the limitations and disadvantages of the related art.

Means to Solve the Problem

According to an aspect of the invention, an information processing apparatus includes a storage unit that stores, associating with first identification information of a first program, which causes the information processing apparatus to function as a display control unit that displays a screen and to function as a process control unit that executes a process according to an input to the screen, information indicating whether there is a change in the screen and whether there is a change in the process; and a request unit that requires, in a case where the information which the storage unit stores indicates that there is a change in the screen, a second program, which is related to second identification information associated with the first identification information and stored in the storage unit, to display a changed screen, and that requires, in a case where the information which the storage unit stores indicates that there is a change in the process, a third program, which is related to third identification information associated with the first identification information and stored in the storage unit, to execute a changed process.

According to another aspect of the invention, an information processing method executes a storage step of storing in a storage unit, associating with first identification information of a first program, which causes the information processing apparatus to function as a display control unit that displays a screen and to function as a process control unit that executes a process according to an input to the screen, information indicating whether there is a change in the screen and whether there is a change in the process; and a request step of requiring, in a case where the information which the storage unit stores indicates that there is a change in the screen, a second program, which is related to second identification information associated with the first identification information and stored in the storage unit, to display a changed screen, and requiring, in a case where the information which the storage unit stores indicates that there is a change in the process, a third program, which is related to third identification information associated with the first identification information and stored in the storage unit, to execute a changed process.

According to yet another aspect of the invention, a non-transitory computer-readable storage medium stores a program for causing a computer to perform a process in an information processing apparatus. The process includes a storage step of storing in a storage unit, associating with first identification information of a first program, which causes the information processing apparatus to function as a display control unit that displays a screen and to function as a process control unit that executes a process according to an input to the screen, information indicating whether there is a change in the screen and whether there is a change in the process; and a request step of requiring, in a case where the information which the storage unit stores indicates that there is a change in the screen, a second program, which is related to second identification information associated with the first identification information and stored in the storage unit, to display a changed screen, and requiring, in a case where the information which the storage unit stores indicates that there is a change in the process, a third program, which is related to third identification information associated with the first identification information and stored in the storage unit, to execute a changed process.

According to the present invention, an information processing apparatus, an information processing method and a storage medium that can improve efficiency in customizing programs are provided.

BRIEF DESCRIPTION OF DRAWINGS

FIG. 8 is a diagram illustrating an example of a configuration of customization information according to the present embodiment;

FIG. 14 is a diagram for explaining a process of a second customization according to the present embodiment;

BEST MODE FOR CARRYING OUT THE INVENTION

Figure 1:
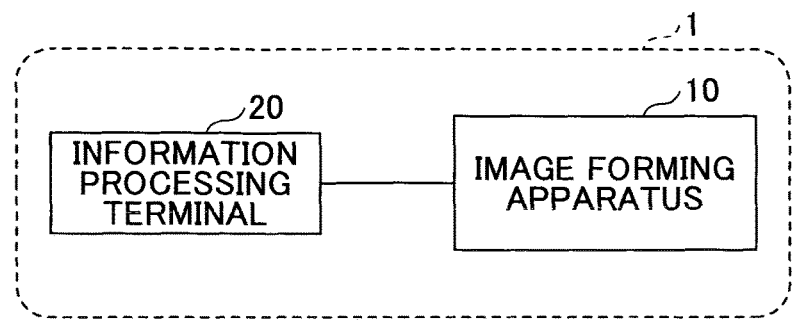
FIG. 1 is a diagram illustrating an example of a configuration of an information processing system according to a present embodiment.

In the following, embodiments of the present invention will be explained with reference to the accompanying drawings. FIG. 1 is a diagram illustrating an example of a configuration of an information processing system according to the present embodiment. In the information processing system 1 as shown in FIG. 1, an image forming apparatus 10 is connected to an information processing terminal 20 for a communications connection. A communication between the image forming apparatus 10 and the information processing terminal 20 is performed via a USB (Universal Serial Bus), a near field wireless communication or a network such as a LAN (wired or wireless).

The image forming apparatus 10 is a multifunction peripheral which realizes two or more functions in one chassis selected from printing, scanning, copying, transmitting/receiving a facsimile and the like. However, a device having any one function may be used as the image forming apparatus 10. Moreover, the image forming apparatus 10 according to the present embodiment is an example of the device. A device such as a projector, a video conference system or a digital camera may be used instead of the image forming apparatus 10.

The image processing terminal 20 is an electronic device that can execute an information process which is completed by itself such as a smartphone or a tablet-type terminal device. In the present embodiment, the information processing terminal 20 functions as an operation unit of the image forming apparatus 10. In more detail, the information processing terminal 20 is connected to the image forming apparatus 10 instead of an operation panel which has been conventionally provided as a dedicated operation unit of the image forming apparatus 10.

The information processing terminal 20 is provided, for example, fixed at a predetermined position on the image forming apparatus 10 (for example, the position where the operation panel is provided). Accordingly, the information processing terminal 20 and the image forming apparatus 10 may be perceived as one apparatus. Moreover, the information processing terminal 20 may be detachable (separable) from the image forming apparatus 10. In the state where the information processing terminal 20 is detached, the information processing terminal 20 may function as the operation unit of the image forming apparatus 10 via a wireless communication or the like such as Bluetooth (trademark registered) or an infrared communication.

Figure 2:
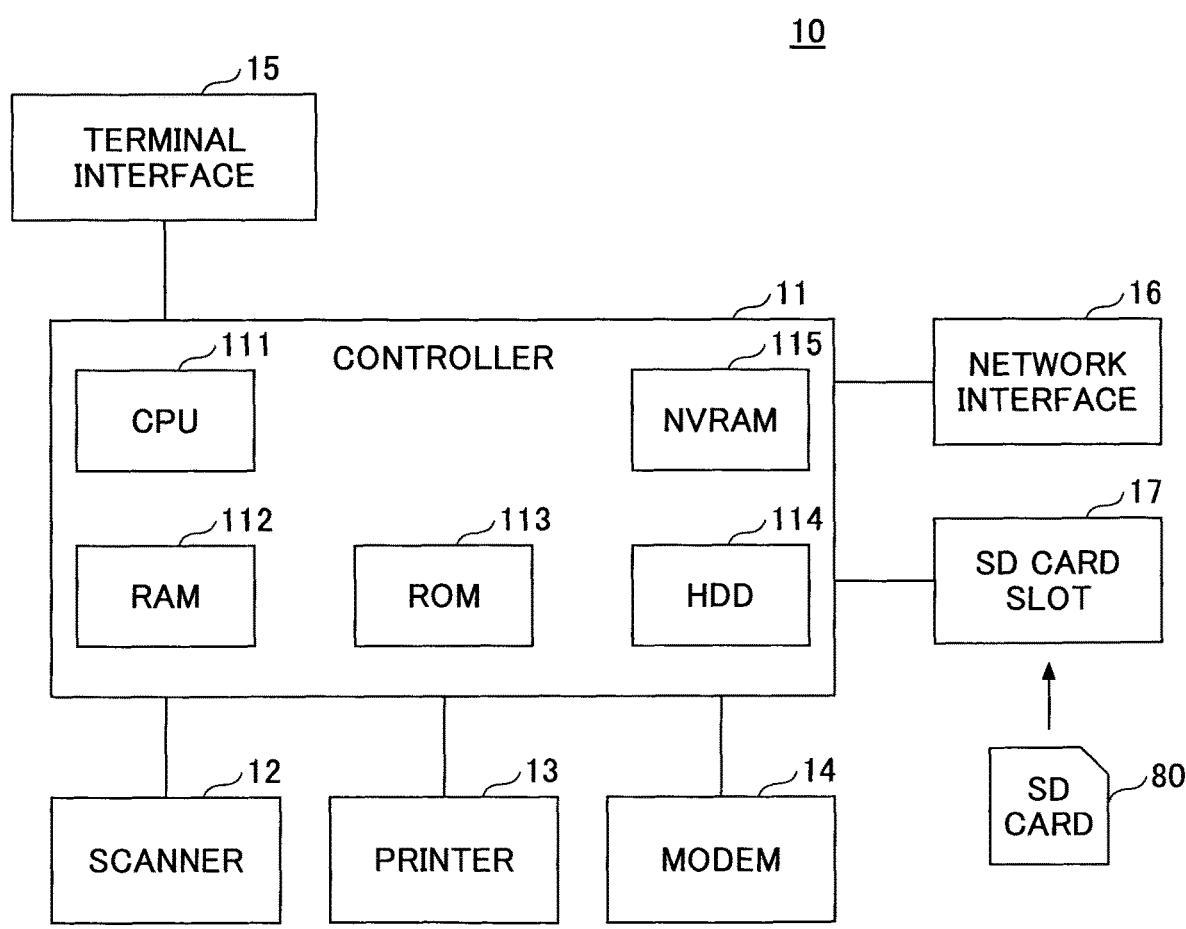
FIG. 2 is a diagram illustrating an example of a hardware configuration of an image forming apparatus according to the present embodiment.

FIG. 2 is a diagram illustrating an example of a hardware configuration of the image forming apparatus according to the present embodiment. In FIG. 2, the image forming apparatus 10 includes a controller 11, a scanner 12, a printer 13, a modem 14, a terminal interface 15, a network interface 16, a SD (Secure Digital) card slot 17 and the like.

The controller 11 includes a CPU (Central Processing Unit) 111, a RAM (Random Access Memory) 112, a ROM (Read-Only Memory) 113, a HDD (Hard Disk Drive) 114, a NVRAM (Non-Volatile Random Access Memory) 115 and the like. The ROM 113 stores various programs, data used by the programs and the like. The RAM 112 is used as a storage area in which programs are loaded, a work area for the loaded programs and the like. The CPU 111 realizes various functions by processing programs loaded on the RAM 112. The HDD 114 stores programs, various data used by the programs and the like. The NVRAM 115 stores various configuration information and the like.

The scanner 12 is hardware (an image scanning means) that scans image data from a document. The printer 13 is hardware (an printing means) that prints print data on a print sheet. The modem 14 is hardware that connects the image forming apparatus 10 to a phone line and used for transmitting/receiving image data in a facsimile communication. The terminal interface 15 is an interface for communicating with (connecting to) the information processing terminal 20. For example, the terminal interface 15 may be a USB interface or hardware for the near field communication. Moreover, the terminal interface 15 may be hardware that connects the image forming apparatus 10 to a (wired or wireless) network such as LAN (Local Area Network). The SD card slot 17 is used for reading programs stored in an SD card 80. That is, the image forming apparatus 10 can execute not only the program stored in the ROM 113 but also the programs in the SD card 80 which are loaded on the RAM 112. Meanwhile, other recording media (for example, a CD-ROM (Compact Disc Read Only Memory), a USB (Universal Serial Bus) memory or the like) may be used instead of the SD card 80. That is, a kind of recording medium corresponding to the SD card 80 is not limited to a predetermined one. In this case, the SD card slot 17 may be replaced by hardware according to the kind of the recording medium.

Figure 3:
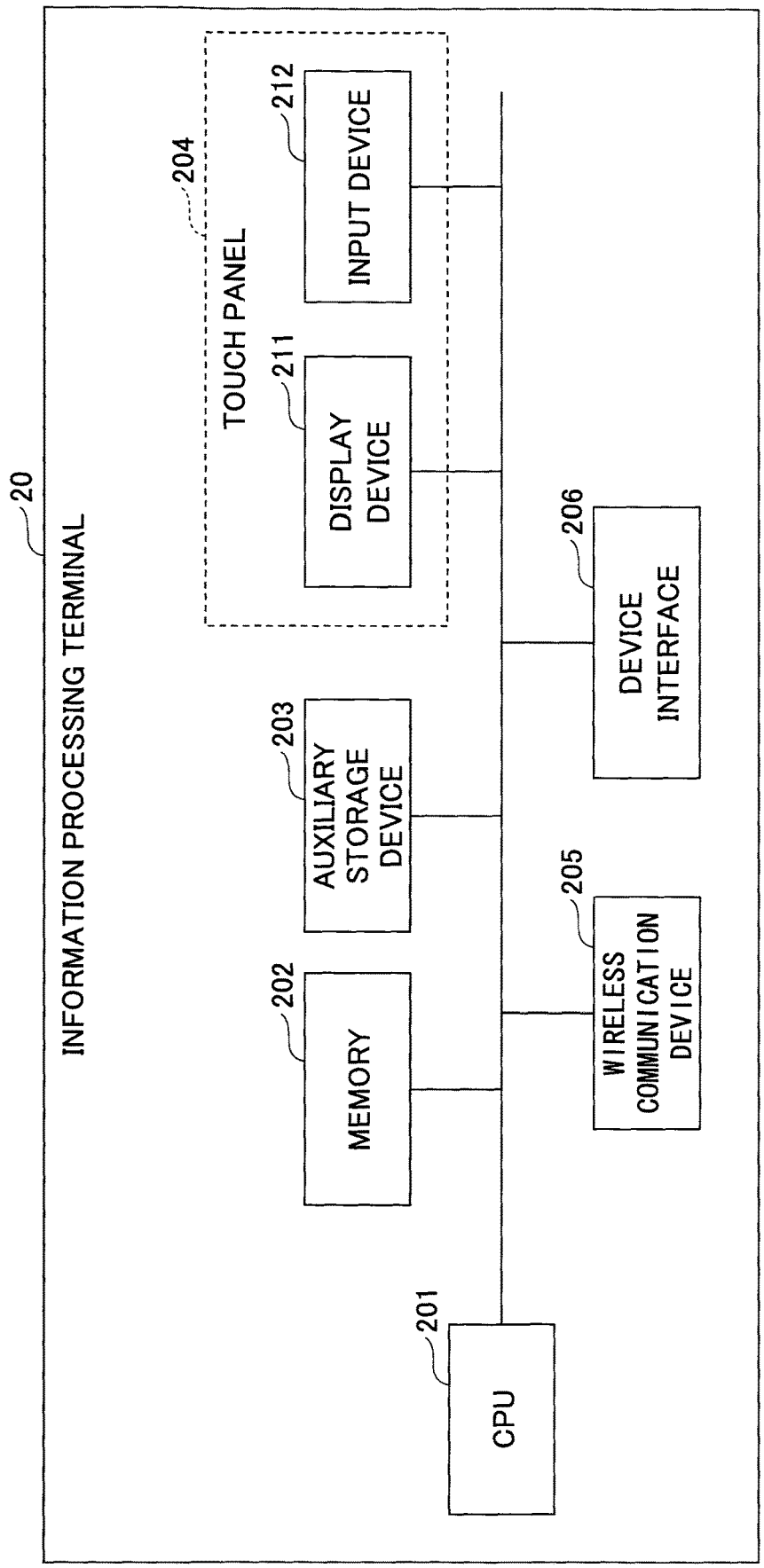
FIG. 3 is a diagram illustrating an example of a hardware configuration of an information processing terminal according to the present embodiment.

FIG. 3 is a diagram illustrating an example of a hardware configuration of the information processing terminal according to the present embodiment. In FIG. 3, the information processing terminal 20 includes a CPU 201, a memory 202, an auxiliary storage device 203, a touch panel 204, a wireless communication device 205, a device interface 206 and the like.

The auxiliary storage device 203 stores programs or the like installed in the information processing terminal 20. The memory 202 reads out and retains the program from the auxiliary storage device upon receiving a start-up instruction for the program. The CPU 201 realizes functions related to the information processing terminal 20 according to the program stored in the memory 202.

The touch panel 204 is an electronic component provided with both a function of inputting and a function of displaying. The touch panel 204 displays information and receives an input by a user or the like. The touch panel 204 includes a display device 211 and an input device 212 and the like.

The display device 211 is a liquid crystal display or the like and is provided with the function of displaying of the touch panel 204. The input device 212 is an electronic component including a sensor that detects a contacting body contacting with the display device 211. The method of detecting a contact by the contacting body may be any of the publicly known methods including an electrostatic method, a resistance film method, an optical method and the like. Meanwhile, the contacting body is a body that contacts with a contact face (surface) of the touch panel 204. The contacting body includes, for example, a finger of the user, a dedicated or general pen or the like.

The wireless communication device 205 is an electronic component which is necessary for a communication in a wireless LAN (Local Area Network) or a mobile communication network, such as an antenna. The device interface 206 is an interface for communicating with the image forming apparatus 10. That is, the device interface 206 communicates with the image forming apparatus 10 in a mode corresponding to the terminal interface 15.

Figure 4:
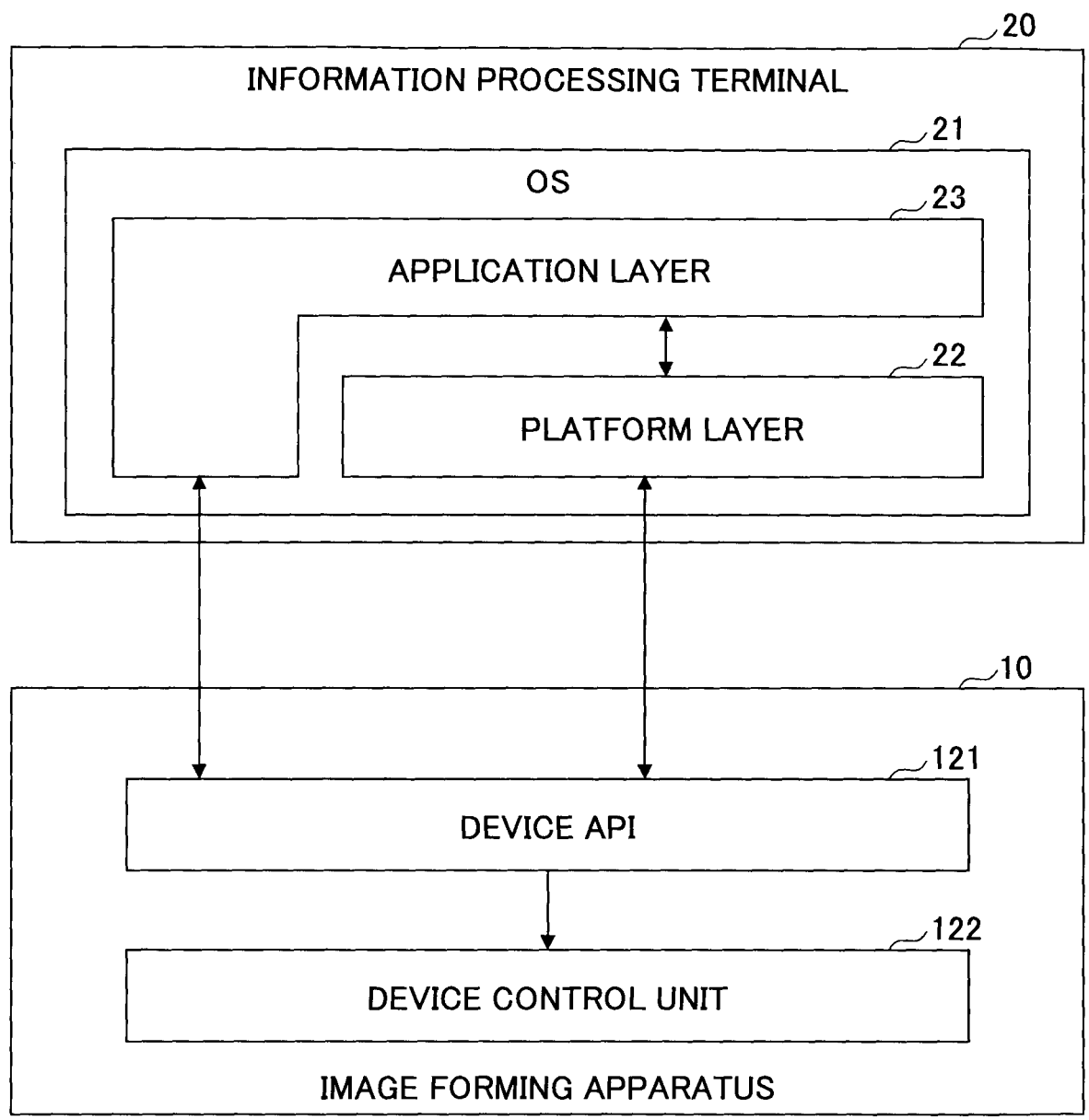
FIG. 4 is a diagram illustrating an example of a software configuration of the information processing system according to the present embodiment.

FIG. 4 is a diagram illustrating an example of a software configuration of the information processing system according to the present embodiment.

In FIG. 4, the image forming apparatus 10 includes a device API 121, a device control unit 122 and the like. The device API 121 is an API (Application Program Interface) that receives a request from outside the image forming apparatus 10. In the present embodiment, the device API 121 is realized as a Web API. That is, the device API 121 is implemented as an API that uses a HTTP (Hyper Text Transfer Protocol) communication. In this case, by a URL (Uniform Resource Locator) designated as a HTTP request, a kind of the request or the content of the request is indicated. However, the communication protocol realizing the device API 121 is not limited to the HTTP. For example, a SOAP (Simple Object Access Protocol) may be used or other communication protocol may be used.

The device control unit 122 executes a process in response to the request received by the device API 121. Meanwhile, in FIG. 4 the device control unit 122 is shown as one block, but for example the device control unit 122 may be divided according to the functions. Moreover, the respective device control units 122 may be realized by a process which an application program (hereinafter, simply referred to as "application") on the side of the image forming apparatus 10 makes the CPU 111 execute.

On the other hand, the information processing terminal 20 includes an OS (Operating System) 21, a platform layer 22, an application layer 23 and the like. They are realized by a process which the program installed in the information processing terminal 20 makes the CPU 201 execute.

The OS 21 is a general OS (Operating System) or an OS dedicated to the information processing terminal 20. The platform layer 22 and the application layer 23 operate on the OS 21, or are controlled by the OS 21.

The application layer 23 is an aggregation of applications that execute processes by conversation with a user. Each of the applications displays a screen on the display device 211, and makes the CPU 201 execute a process in response to an input to the screen.

The platform layer 22 is a program group that provides an API wrapping the device API 121. As described above, the device API 121 is a Web API. A platform API provides an API that makes the device API 121 easily accessible by a program implemented by a specific programming language such as Java (trademark registered). The platform API includes, for example, a Java (trademark registered) based API. However, as shown in FIG. 4 where the application layer 23 and the device API 121 are connected by a double-headed arrow, each of the application can freely determine whether to use the platform layer 22.

Figure 5:
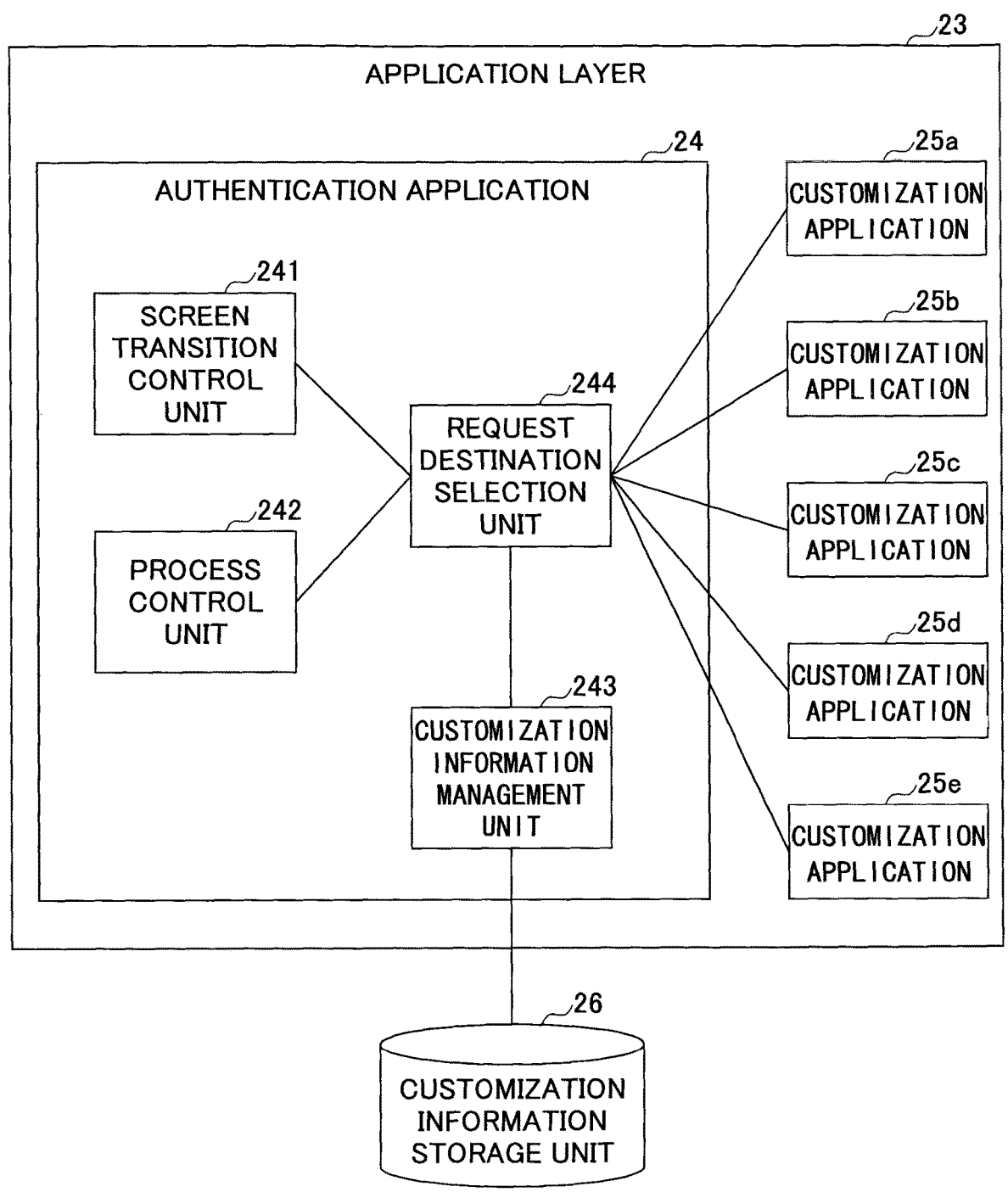
FIG. 5 is a diagram illustrating an example of a configuration of an application layer in the information processing terminal according to the present embodiment.

FIG. 5 is a diagram illustrating an example of a software configuration of the application layer in the information processing terminal. FIG. 5 shows, in the application layer 23, an authentication application 24 as an example of a default customizable application. The default application means a default application as an object to be installed in the information processing terminal 20. Meanwhile, a customizable application, which is a default application other than the authentication application 24, may have the configuration of a function as shown in FIG. 5.

As shown in FIG. 5, the authentication application 24 makes the CPU 201 function as a screen transition control unit 241, a process control unit 242, a customization information management unit 243, a request destination selection unit 244 and the like.

The screen transition control unit 241 controls a display and a transition (screen flow) of the screen related to the authentication process for a user. The transition of the screen means a transition from a screen to the next screen in the case where plural screens to be displayed are prepared. The process control unit 242 executes a process in response to an input to the screen that the screen transition control unit 241 causes to be displayed.

The customization information management unit 243 writes customization information into a customization information storage unit 26 and reads out customization information from the customization information storage unit 26. The customization information is information indicating whether to customize the screen transition control unit 241 or the process control unit 242 by a customization application 25. That is, the customization information is information indicating whether the customization application 25 changes the screen displayed related to the authentication application 24 or whether the customization application 25 changes an authentication process executed in response to the input to the screen. Meanwhile, the customization information storage unit 26 can be realized, for example, by using the auxiliary storage device 203.

The request destination selection unit 244 refers to the customization information and selects a request destination of the display process of the screen related to the authentication application 24 and a request destination of the process in response to the input to the screen.

The customization application 25 is an application that changes a part of or whole of the customizable default application. In FIG. 5, customization applications 25a to 25e are shown as examples of customization application 25 for the authentication application 24. Each of the customization applications 25a to 25e executes at least any one of the process that the screen transition control unit 241 and the process that the process control unit 242, thereby the process is changed.

Figure 6:
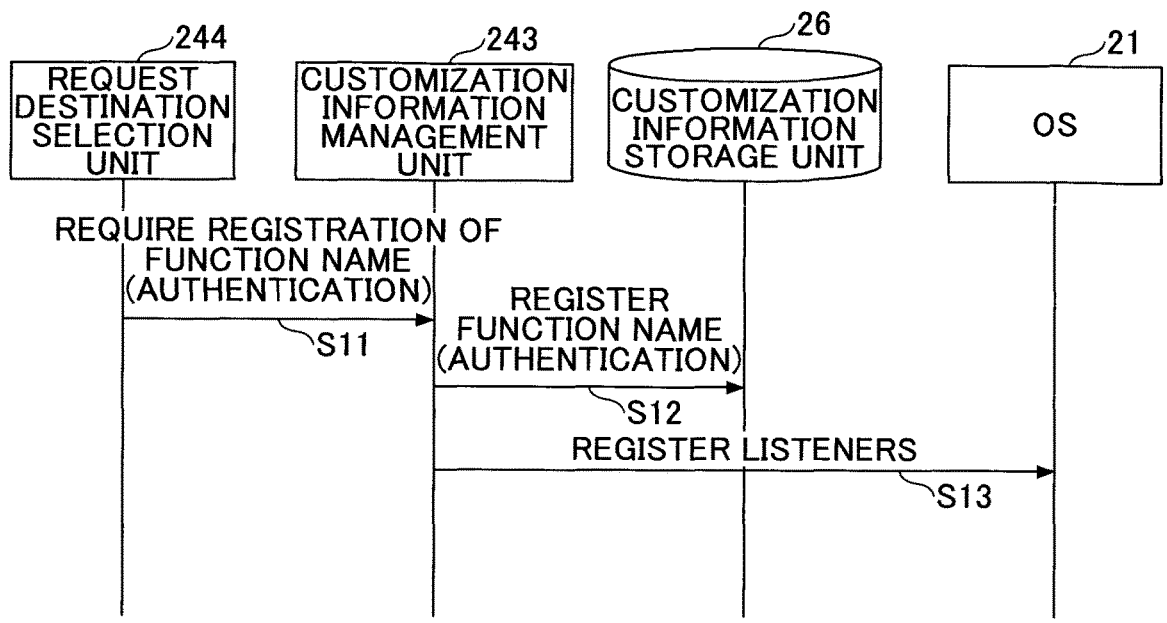
FIG. 6 is a sequence diagram for explaining an example of a process procedure executed when a default customizable application is installed in the information processing terminal according to the present embodiment.

In the following, the process procedure that the information processing terminal 20 executes will be explained. FIG. 6 is a sequence diagram for explaining an example of the process procedure executed when the default customizable application is installed in the information processing terminal.

For example, when the authentication application 24 is installed in the information processing terminal 20, the request destination selection unit 244 in the authentication application 24 requires the customization information management unit 243 to register a function name of the authentication application 24 (step S11). The function name is a name that indicates a function of the application. Accordingly, among the plural applications the function name may be common. However, a name of the application which varies by the application (application name) may be the function name. Assume here that the function name of the authentication application 24 is "authentication". The customization information management unit 243 in the authentication application 24 registers the function name in the customization information storage unit 26 (step S12) as an identification name of a customizable function (hereinafter referred to as "customization function name"). Meanwhile, since the customization information management unit 243 also belongs to the authentication application 24, the function name of the authentication application 24 can be obtained. Accordingly, instead of the request destination selection unit 244 requiring to register the function name, the customization information management unit 243 may actively register the function name.

Subsequently, the customization information management unit 243 requires the OS 21 to register a listener for receiving a notification that another application is installed (step S13). The listener may be substantially a "function" or an "object". Then, an address of the "function", the "object" or the like is registered in the OS 21.

As shown in FIG. 6, when plural customizable exiting applications are installed, list of function names of the respective applications is stored in the customization information storage unit 26.

Figure 7:
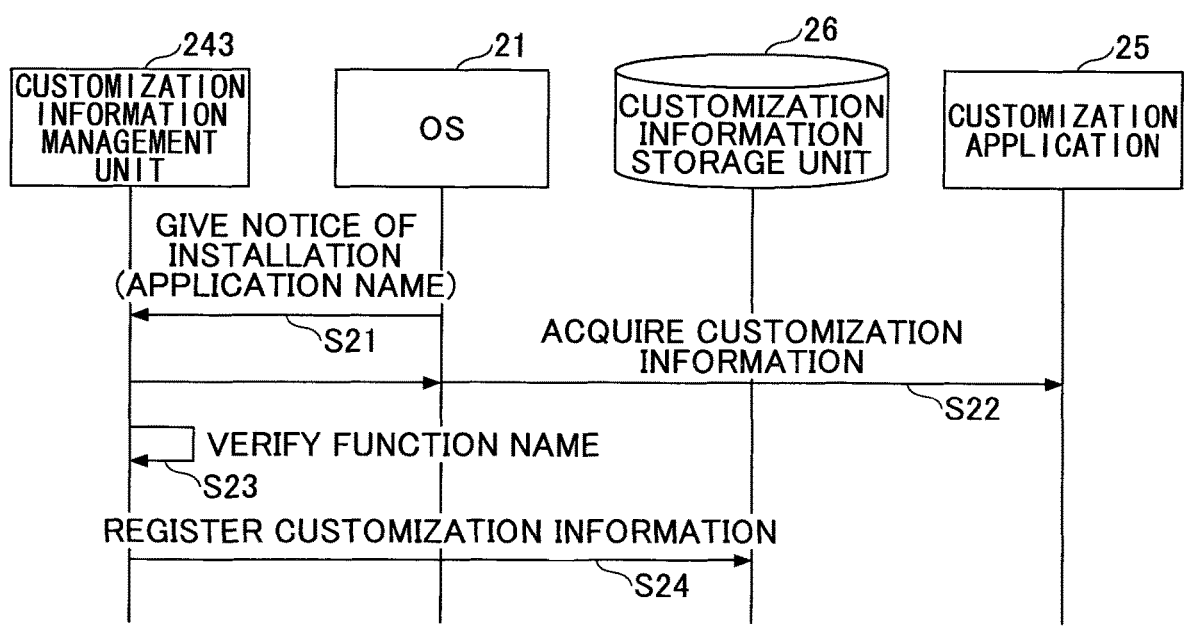
FIG. 7 is a sequence diagram for explaining an example of a process procedure executed when a customization application is installed in the information processing terminal according to the present embodiment.

Subsequently, the process executed when the customization application 25 is installed will be explained. FIG. 7 is a sequence diagram for explaining an example of a process procedure executed when the customization application is installed in the information processing terminal.

When a customization application 25 is installed, the OS 21 gives notice of installation to the registered listener. In the present embodiment, notice of installation is notified to the customization information management unit 243 in the authentication application 24 is given (step S21). The notice of installation includes an application name of the customization application 25 which is installed.

In response to the notice of installation, the customization information management unit 243 acquires customization information from the customization application 25 related to the application name included in the notice (step S22). For example, the customization information may be stored in a file which is associated with the customization application 25.

FIG. 8 is a diagram illustrating an example of a configuration of the customization information. In FIG. 8, each of the items included in the customization information is shown in a form of "<item name>: <value>".

In FIG. 8, the customization information includes items such as a function name, an application name, a screen customization, a process customization or the like. The function name is an identification name of a function which is customized by the customization application 25. The application name is an application name of the customization application 25. The screen customization indicates whether the customization application 25 customizes the screen transition control unit 241 (that is, whether to change the screen). The process customization indicates whether the customization application 25 customizes the process control unit 242 (that is, whether to change the process executed in response to the input to the screen). Values of the screen customization and the process customization are ON or OFF. ON indicates customizing, and OFF indicates not customizing.

The customization information shown in FIG. 8 indicates that the application name of the customization application 25 is "A_APLI" and that the customization application 25 customizes the screen related to the authentication function.

Subsequently, the customization information management unit 243 verifies whether the function name of the acquired customization information coincides with "authentication" which is the function name of the authentication application (step S23). When the function name coincides with "authentication", the customization information management unit 243 associates the customization information with the customization function name, which has been already stored in the customization information storage unit 26 during the install process (see FIG. 6) of the authentication application 24, and stores it in the customization information storage unit 26 (step S24). When the function name of the acquired customization information does not coincide with "authentication" which is the function name of the authentication application 24, the process at step S24 is not executed. The customization information is registered by other default application related to the function name of the customization information.

Figure 9:
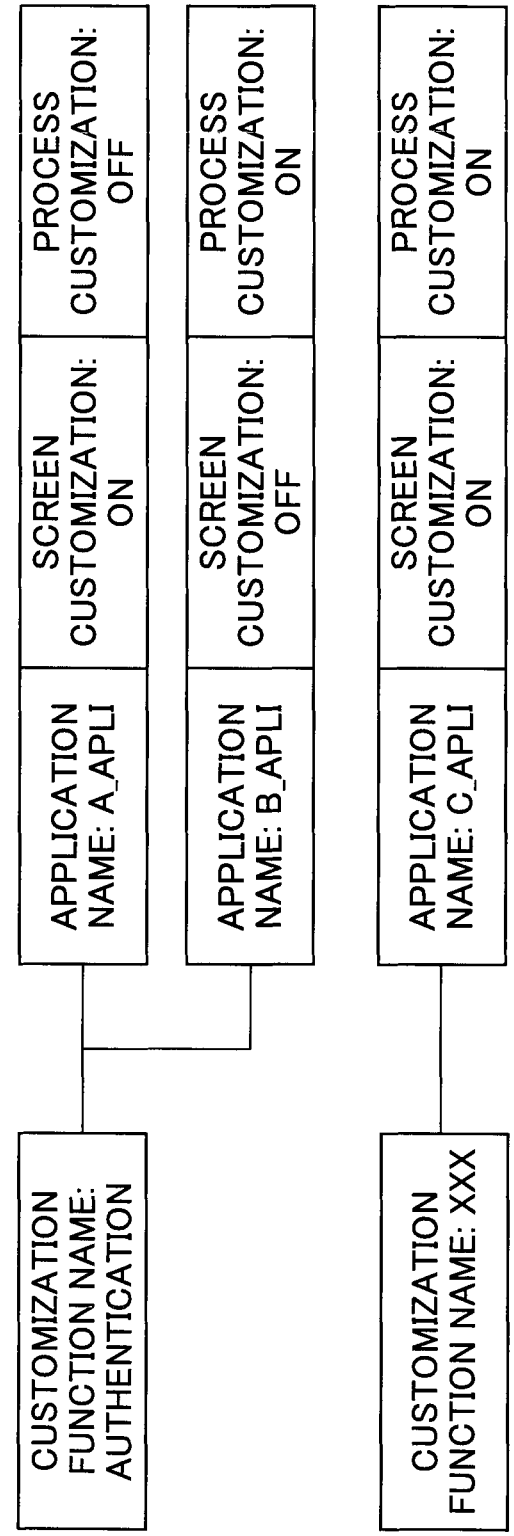
FIG. 9 is a diagram illustrating an example of a configuration of a customization information storage unit according to the present embodiment.

FIG. 9 is a diagram illustrating an example of a configuration of the customization information storage unit. As shown in FIG. 9, the customization information storage unit 26 stores customization information of each of the customization application by associating it with a customization function name.

Figure 10:
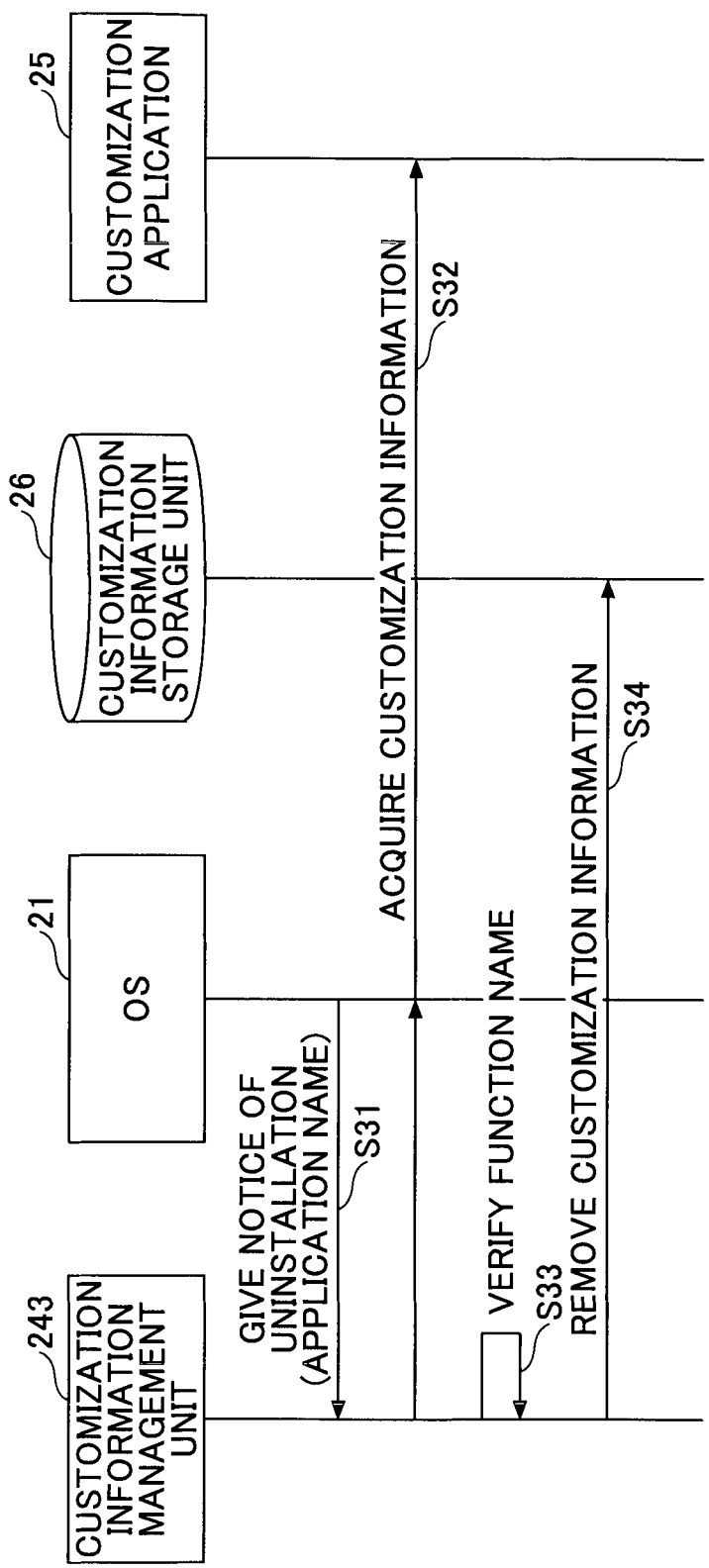
FIG. 10 is a sequence diagram for explaining an example of a process procedure executed when the customization application is uninstalled from the information processing terminal according to the present embodiment.

Subsequently, a process executed when the customization application 25 is uninstalled will be explained. FIG. 10 is a sequence diagram for explaining an example of a process procedure executed when the customization application is uninstalled from the information processing terminal.

When an uninstallation of a customization application 25 starts, the OS 21 gives notice of the uninstallation to the registered listeners. In the present embodiment, the notice of the start of the uninstallation is given to the customization information management unit 243 in the authentication application 24 (step S31). The notice of the start of the uninstallation includes an application name of the customization application 25 which is uninstalled.

The customization information management unit 243, in response to the notice of the start of the uninstallation, acquires customization information from the customization application 25 related to the application name included in the notice (step S32).

Subsequently, the customization information management unit 243 verifies whether the function name of the acquired customization information coincides with "authentication" which is the function name of the authentication application (step S33). When the function name coincides with "authentication", the customization information management unit 243 removes from the customization information storage unit 26 the customization information which coincides with the acquired customization information out of the customization information which is associated with the customization function name "authentication" and stored in the customization information storage unit (step S34).

Subsequently, a default process by the authentication application 24 will be explained. The default process means a process executed in a state where the customization application 25 for the authentication application 24 is not installed.

Figure 11:
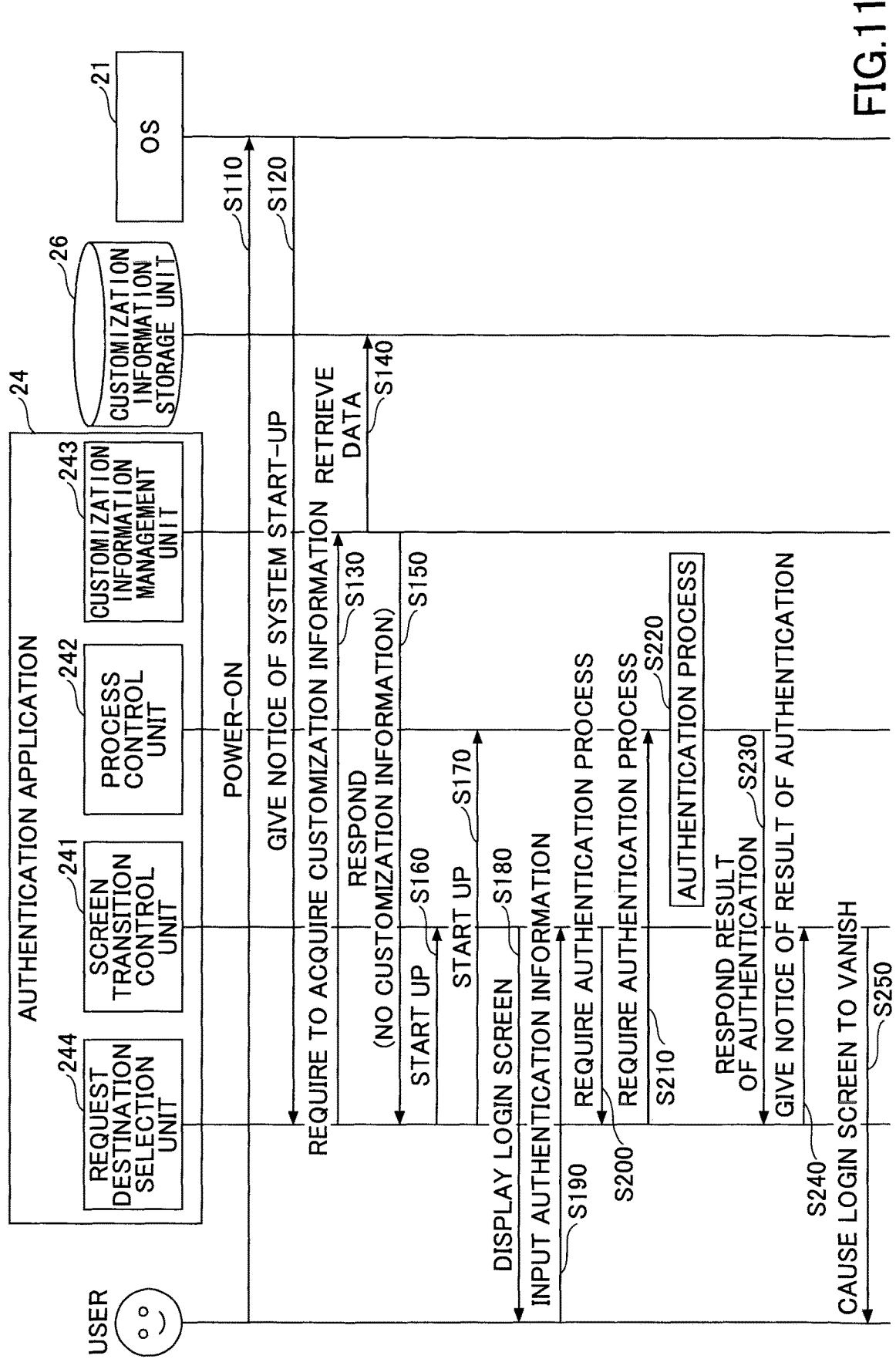
FIG. 11 is a sequence diagram for explaining an example of a process procedure of a default process of an authentication application according to the present embodiment.

FIG. 11 is a sequence diagram for explaining an example of a process procedure of a default process of the authentication application.

When a user applies power to the information processing terminal 20 (step S110), the OS 21 gives notice of a system start-up to the respective applications installed in the information processing terminal 20 (step S120). Meanwhile, the application of power to the information processing terminal 20 may be executed in conjunction with an application of power to the image forming apparatus 10.

The request destination selection unit 244 in the authentication application 24, in response to the notice of the system start-up, requires the customization information management unit 243 to acquire customization information (step S130). The customization information management unit 243 retrieves customization information associated with "authentication" which is the function name of the authentication application 24 from the customization information storage unit 26 (step S140), Here, assume that the corresponding customization information does not exist. Accordingly, the customization information management unit 243 returns a response indicating that there is no customization information to the request destination selection unit 244 (step S150). That is, a response indicating that both the screen customization and the process customization are OFF is returned.

The request destination selection unit 244, based on the response that the screen customization is OFF, starts up the screen transition control unit 241 (step S160). Furthermore, the request destination selection unit 244, based on the response that process customization is OFF, starts up process control unit 242 (step S170). Here, the start-up may be a start-up as a process or a thread, or may be an instruction to execute a process.

The screen transition control unit 241 in response to the start-up displays a default login screen on the display device 211 (step S180). When authentication information is input via the login screen by the user (step S190), the screen transition control unit 241 specifies the input authentication information and requires the request destination selection unit 244 to execute an authentication process (step S200).

The request destination selection unit 244, based on the response that the process customization is OFF, requires the process control unit 242 to execute the authentication process related to the authentication information (step S210). The process control unit 242, in response to the request, executes a default authentication process related to the authentication information (step S220), and returns a result of the authentication process to the request destination selection unit 244 (step S230).

The request destination selection unit 244, based on the response that the screen customization is OFF, gives notice of the result of the authentication process to the screen transition control unit 241 (step S240). The screen transition control unit 241 executes a process according to the result of the authentication process. For example, when the authentication succeeds, the screen transition control unit 241 causes a login screen to vanish (step S250). As a result, for example, an operation on a home screen which is displayed under the login screen becomes possible.

Subsequently, a process procedure executed for the authentication application 24 will be explained in each specific example of customization.

Figure 12:
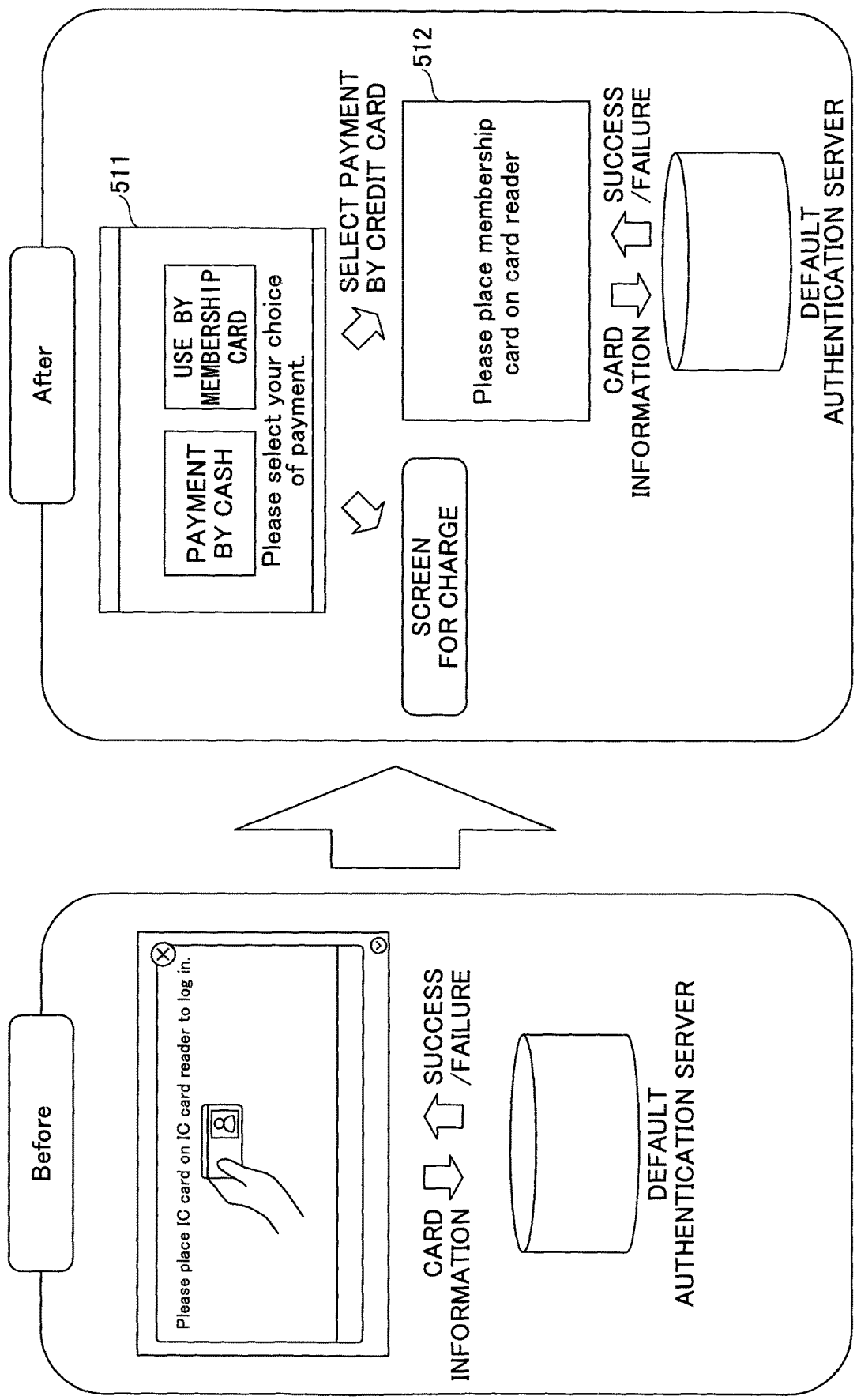
FIG. 12 is a diagram for explaining a process of a first customization according to the present embodiment.

FIG. 12 is a diagram for explaining a process of a first customization. A left part of FIG. 12 illustrates a default process sequence in the specific example of the first customization. In the default process sequence, a login screen that prompts a user to place an IC card is displayed. When the IC card is placed, an authentication process is executed using a default authentication server based on information recorded in the IC card.

On the other hand, a right part of FIG. 12 illustrates a process sequence executed after the first customization is applied. In this process sequence, an initial screen 511 for selecting whether a change amount for use of the image forming apparatus 10 is paid by cash or by credit card is displayed. In the initial screen 511, when payment by credit card is selected, an IC card screen that prompts the user to place an IC card (membership card) is displayed. When the IC card is placed, the authentication process is executed using the default authentication server based on information recorded in the IC card.

In the first customization, the authentication process is the same as the default authentication process. That is, the process control unit 242 in the authentication application 24 can be directly used. Accordingly, in the customization information of the customization application 25a that realizes the first customization, the screen customization is OFF and the process customization is ON. Meanwhile, the application of the first customization means an installation of the customization application 25 that realizes the customization.

Figure 13:
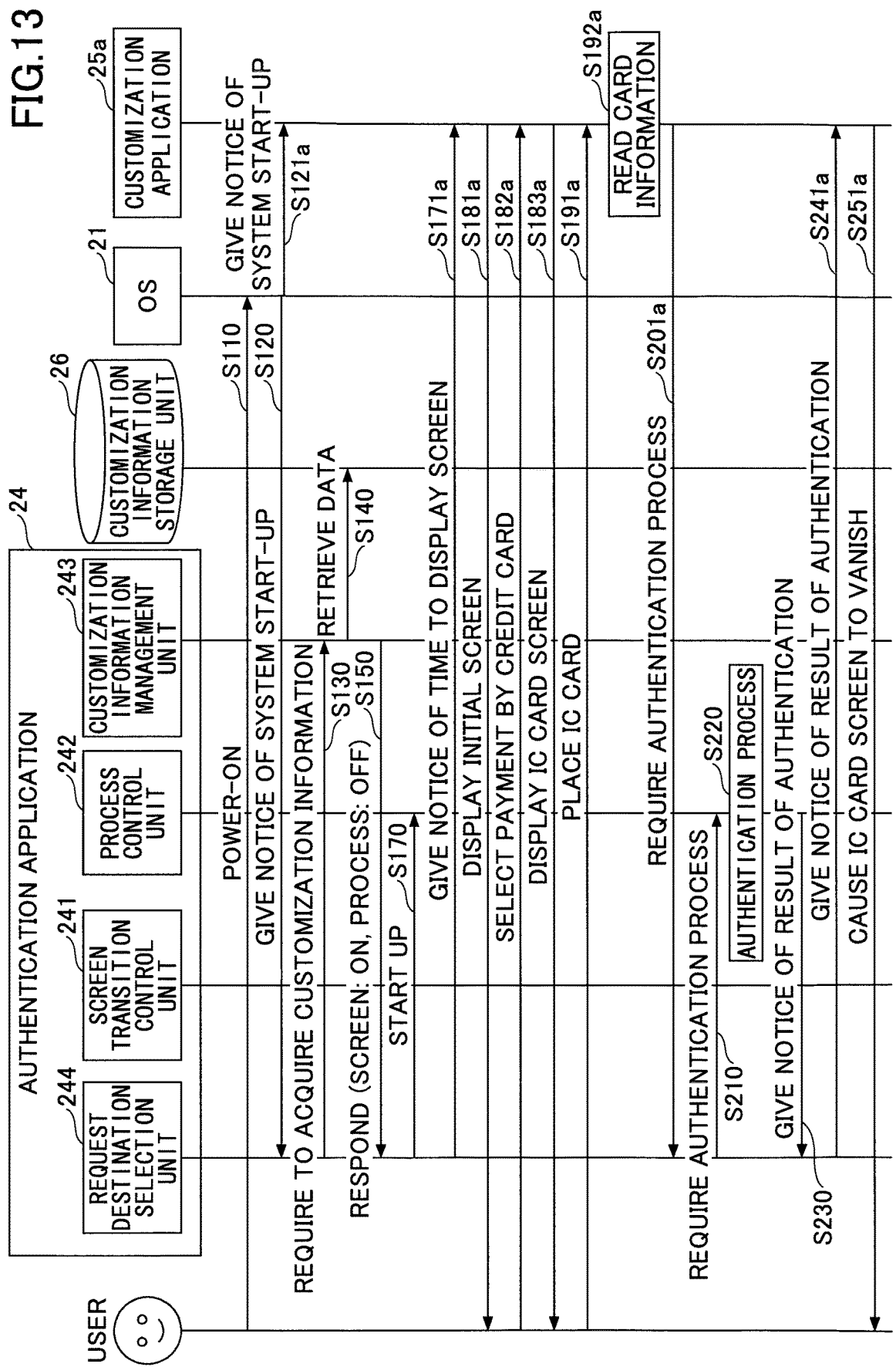
FIG. 13 is a sequence diagram for explaining an example of a process procedure of the authentication application after the first customization is applied according to the present embodiment.

FIG. 13 is a sequence diagram for explaining an example of a process procedure of the authentication application after the first customization is applied. In FIG. 13, to the same steps as in FIG. 11 the same reference numeral is assigned, and an explanation will be appropriately omitted.

In FIG. 13, upon applying power to the information processing terminal 20, notice that the system starts up is given also to the customization application 25a (step S121a). Moreover, at step S150, a response including customization information (hereinafter referred to as "object customization information") indicating that the screen customization is ON and the process customization is OFF is returned to the request destination selection unit 244. The request destination selection unit 244, according to the response that the screen customization is ON, does not execute the start-up process for the screen transition control unit 241 (step S160). Since the screen transition control unit 241 is not started up, displaying the default login screen can be prevented.

On the other hand, the request destination selection unit 244, according to the response that the screen customization is ON, gives notice to the customization application 25a related to an application name included in the object customization information that a time to display a screen arrives (step S171a).

The customization application 25a, in response to the notice, displays the initial screen 511 on the display device 211 (step S181a). However, the customization application 25a may display the initial screen 511 at a specific timing ignoring the notice.

When the payment by credit card is selected by the user via the initial screen 511 (step S182a) the customization application 25a displays an IC card screen 512 on the display device 211 (step S183a). When the user places an IC card on a card reader which is not displayed (step S191a), the customization application 25a reads information recorded in the IC card (hereinafter referred to as "card information") (step S192a). Subsequently, the customization application 25a requires the request destination selection unit 244 to execute the authentication process based on the card information (step S201a).

According to the request, based on the response that the process customization is OFF, processes at steps S210 to S230 are executed.

Subsequently, the request destination selection unit 244 gives notice of a result the authentication process responded at step S230 to the customization application 25a related to the application name included in the object customization information (step S241a). The customization application 25a executes a process according to the result of the authentication process. For example, when the authentication succeeds, the customization application 25a causes the IC card screen 512 to vanish (step S251a).

Next, an example of second customization will be explained. FIG. 14 is a diagram for explaining a process of the second customization. A left part of FIG. 14 illustrates a default sequence in the specific example of the second customization. In the default process sequence, a login screen for inputting a username and a password is displayed, and an authentication process based on the input username and the password is executed using the default authentication server.

On the other hand, a right part of FIG. 14 illustrates a process sequence executed after the second customization is applied. In this process sequence, an authentication server corresponding to a customization application 25b that realizes the second customization, not the default server, is used in the authentication process.

In the second customization, a displayed screen is the same as the default screen. That is, the screen transition control unit 241 in the authentication application 24 can be directly used. On the other hand, the authentication process is different from the default authentication process. Accordingly, in the customization information of the customization application 25b that realizes the second customization, the screen customization is OFF and the process customization is ON.

Figure 15:
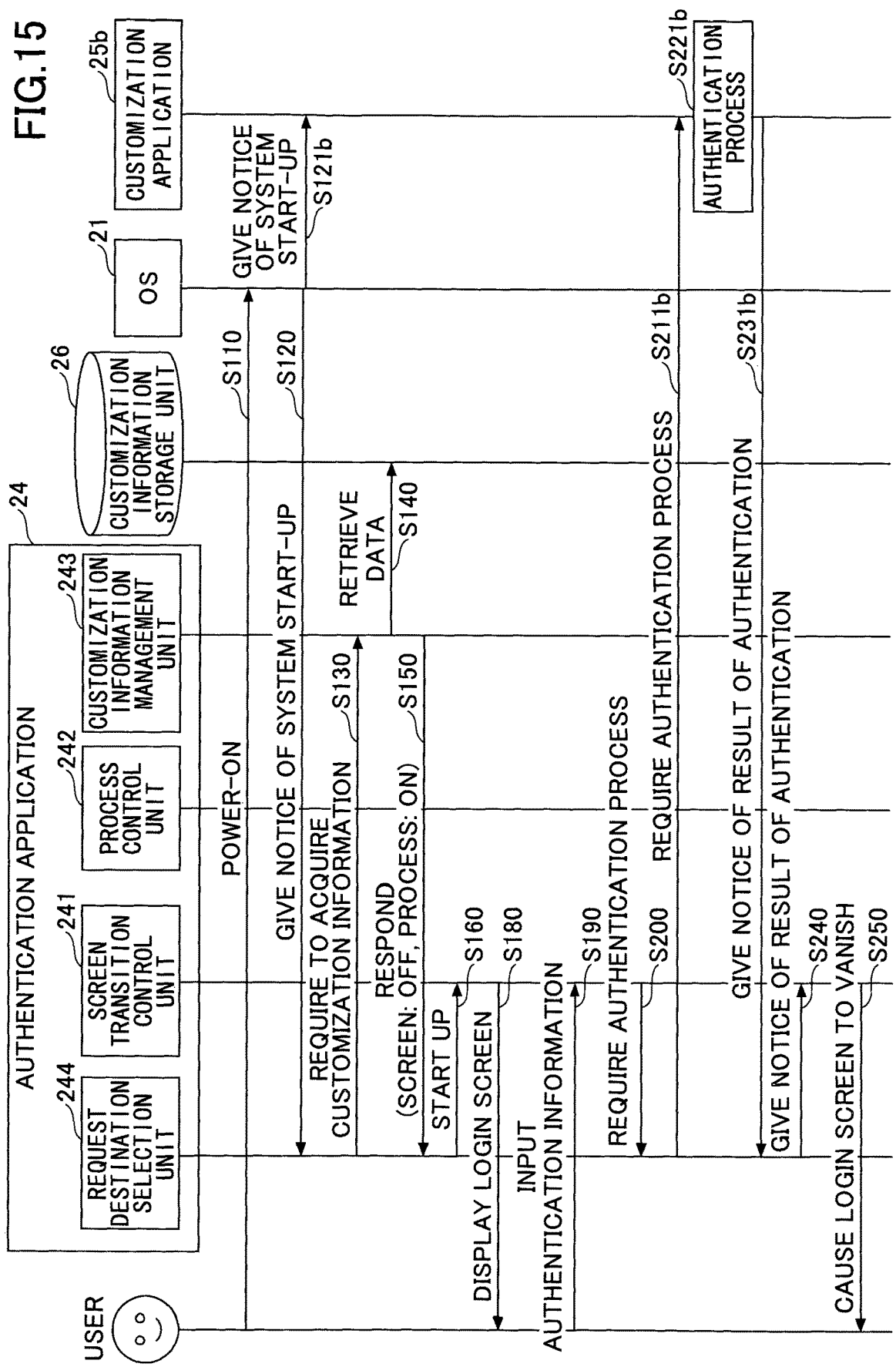
FIG. 15 is a sequence diagram for explaining an example of a process procedure of the authentication application after the second customization is applied according to the present embodiment.

FIG. 15 is a sequence diagram for explaining an example of a process procedure of the authentication application after the second customization is applied. In FIG. 15, to the same steps as in FIG. 11 the same reference numeral is assigned, and an explanation will be appropriately omitted.

In FIG. 15, upon applying power to the information processing terminal 20, notice that the system starts up is given also to the customization application 25b (step S121b). Moreover, at step S150, a response including customization information (hereinafter referred to as "object customization information") indicating that the screen customization is OFF and the process customization is ON is returned to the request destination selection unit 244. The request destination selection unit 244 according to the response that the process customization is ON, does not execute the start-up process for the process control unit 242 (step S170).

The request destination selection unit 244, according to a request for executing the authentication process based on the authentication information (username and password) input to the login screen that the screen transition control unit 241 causes to display, based on the response that the process customization is ON, requires the customization application 25b related to the application name included in the object customization information to execute the authentication process based on the authentication information (step S211b).

The customization application 25b executes the authentication process using an authentication server for the customization application 25b (step S221b) and returns a result of the authentication process to the request destination selection unit 244 (step S231b).

Subsequently, processes at steps S240 and S250 are executed.

Figure 16:
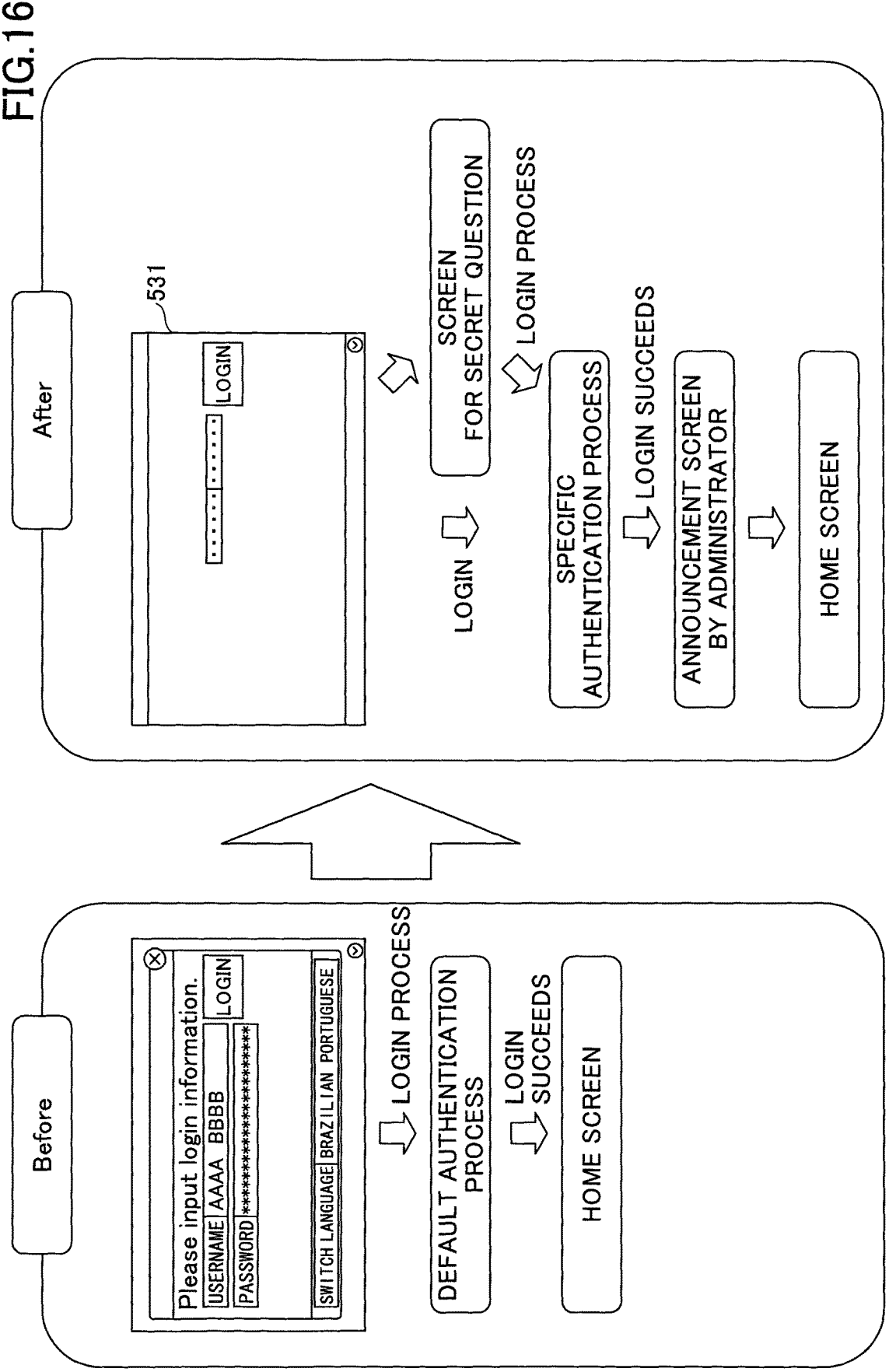
FIG. 16 is a diagram for explaining a process of a third customization according to the present embodiment.

Next, an example of third customization will be explained. FIG. 16 is a diagram for explaining a process of the third customization. A left part of FIG. 16 illustrates a default sequence in the specific example of the third customization. In the default process sequence, a login screen for inputting a username and a password is displayed, and an authentication process based on the input username and the password is executed using the default authentication server.

On the other hand, a right part of FIG. 16 illustrates a process sequence executed after the third customization is applied. In this process sequence, a login screen 531 specific to a customization application 25c is displayed. A username and a password are input to the login screen 531. Subsequently, a process procedure branches based on whether the login based on the input username and the password is a login after a long time. The login after a long time means that a predetermined time has elapsed since the previous login was performed. If it is not the login after a long time, an authentication process specific to the customization application 25c is executed based on the username and the password input to the login screen 531. If it is the login after a long time, a screen of a secret question is displayed. In the screen of the secret question, a question which has been selected by the user in advance is displayed, and an answer to the question can be input. When the answer to the question is input to the screen of the secret question, a authentication process specific to the customization application 25c is executed based on the username input to the login screen 531 and the password and the answer.

When the authentication in the authentication process specific to the customization application 25c succeeds, after an announcement screen by an administrator is displayed, a home screen is displayed.

In the third customization, both the screen transition and the authentication process are different from the default transition and the default process, respectively. Accordingly, in customization information of the customization application 25c that realizes the third customization, the screen customization is ON and the process customization is ON.

Figure 17:
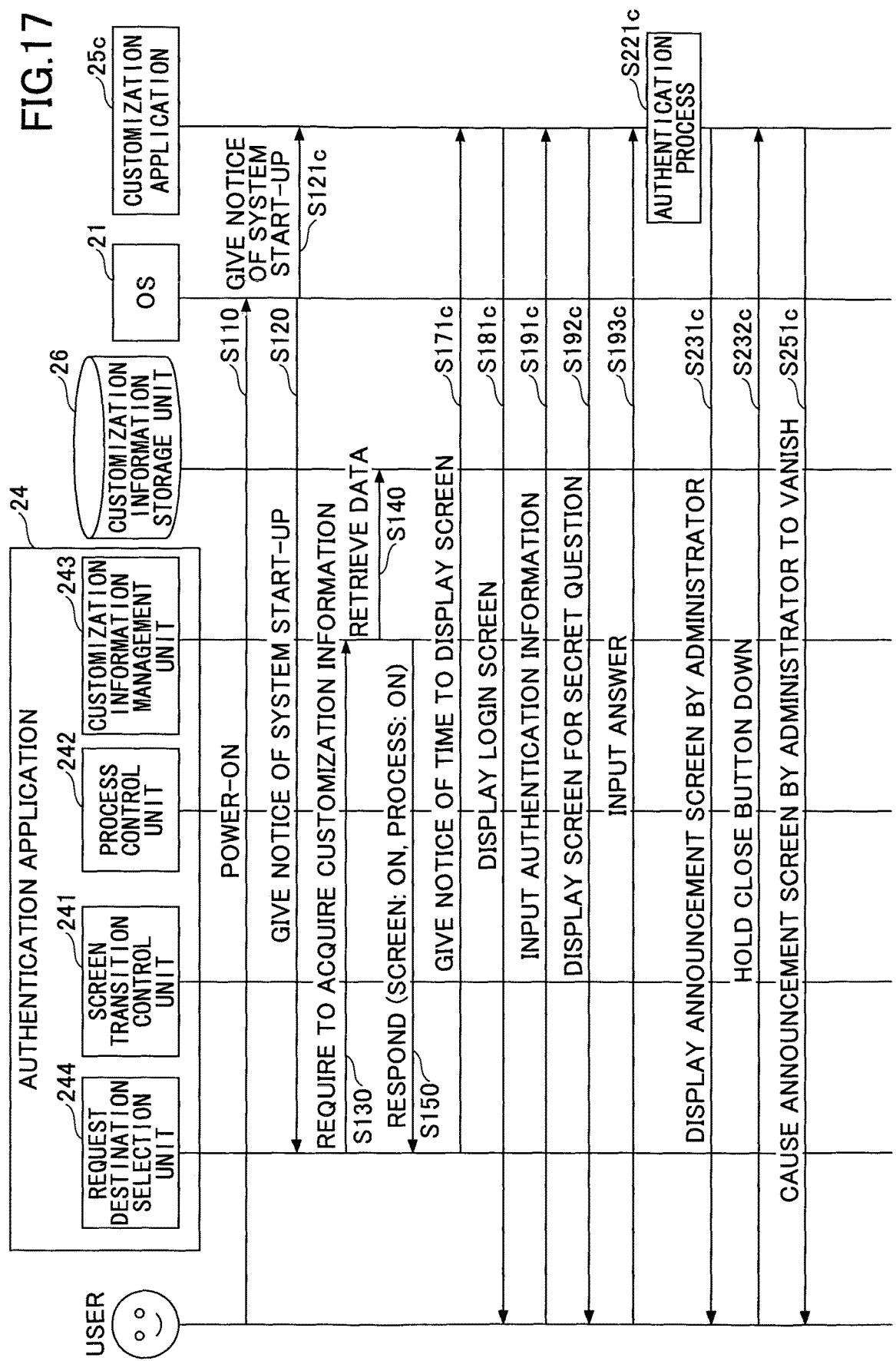
FIG. 17 is a sequence diagram for explaining an example of a process procedure of the authentication application after the third customization is applied according to the present embodiment.

FIG. 17 is a sequence diagram for explaining an example of a process procedure of the authentication application after the third customization is applied. In FIG. 17, to the same steps as in FIG. 11 the same reference numeral is assigned, and an explanation will be appropriately omitted.

In FIG. 17, upon applying power to the information processing terminal 20, notice that the system start up is given also to the customization application 25c (step S121c). Moreover, at step S150, a response including customization information (hereinafter referred to as "object customization information") indicating that the screen customization is ON and the screen customization is ON is returned to the request destination selection unit 244. The request destination selection unit 244, according to the response that both the screen customization and the process customization are ON, does not execute the start-up process for the screen transition control unit 241 (step S160) and the start-up process for the process control unit 242 (step S170).

On the other hand, the request destination selection unit 244, according to the response that the screen customization is ON, gives notice to the customization application 25c related to an application name included in the object customization information that a time to display a screen arrives (step S171c).

The customization application 25c, in response to the notice, displays a login screen 531 on the display device 211 (step S181c). However, the customization application 25c may display the login screen 531 at a specific timing ignoring the notice.

When authentication information (username and password) is input by the user via the login screen 531 (step S191c), the customization application 25c determines whether a login based on the username is a login after a long time. For example, the auxiliary storage device 203 may store information indicating the time when each of the users logs in or logged out last time. It may be determined whether the login based on the username input to the login screen 531 is the login after a long time using the above-described information.

When the login based on the input username is the login after a long time, the processes at steps S192c and S193c are executed. At step S192c, the customization application 25c displays a screen of a secret question on the screen device 211. When an answer is input to the screen of the secret question (step S193c), the customization application 25c executes a specific authentication process (step S221c).

When an authentication in the authentication process succeeds, the customization application 25c displays an announcement screen by an administrator on the display device 211 (step S231c). In the screen, for example, a message registered by the administrator in advance is displayed. When the user holds down a "close" button in the screen (step S232c), the customization application 25c causes the announcement screen by the administrator to vanish. As a result, a home screen is displayed.

Next, an example of a fourth customization will be explained. In the fourth customization, the screen transition control unit 241 and the process control unit 242 are customized by the customization applications 25 which are different from each other. Specifically, the screen transition control unit 241 is customized by the customization application 25d. The process control unit 242 is customized by the customization application 25e. Accordingly, in customization information of the customization application 25d, the screen customization is ON and the process customization is OFF. On the other hand, in customization information of the customization application 25e, the screen customization is OFF and the process customization is ON.

Figure 18:
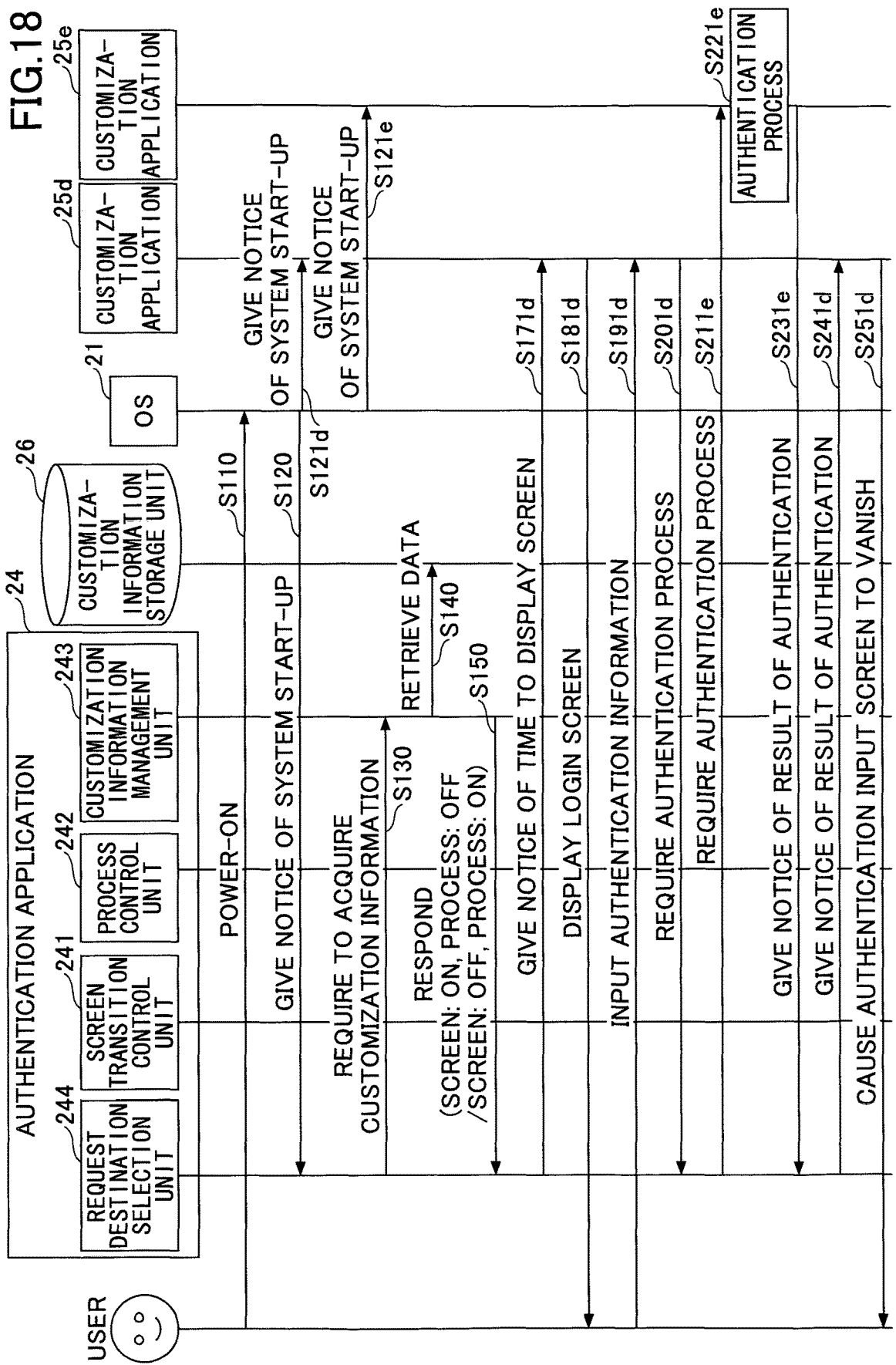
FIG. 18 is a sequence diagram for explaining an example of a process procedure of the authentication application after a fourth customization is applied according to the present embodiment.

FIG. 18 is a sequence diagram for explaining an example of a process procedure of the authentication application after the fourth customization is applied. In FIG. 18, to the same steps as in FIG. 11 the same reference numeral is assigned, and an explanation will be appropriately omitted.

In FIG. 18, upon applying power to the information processing terminal 20, notice that the system start up is given also to the customization application 25d and to the customization application 25e (steps S121d and S121e). Moreover, at step S150, a response including customization information of the customization application 25d (hereinafter referred to as "object customization information d") indicating that the screen customization is ON and the process customization is OFF and customization information of the customization application 25e (hereinafter referred to as "object customization information e") indicating that the screen customization is OFF and the process customization is ON is returned to the request destination selection unit 244. The request destination selection unit 244, according to the response that the screen customization of the object customization information d is ON, does not execute the start-up process for the screen transition control unit 241 (step S160). Moreover, the request destination selection unit 244, according to the response that the process customization of the object customization information e is ON, does not execute the start-up process for the process control unit 242 (step S170).

On the other hand, the request destination selection unit 244, according to the response that the screen customization of the object customization information d is ON, gives notice to the customization application 25d related to an application name included in the object customization information d that a time to display a screen arrives (step S171d).

The customization application 25d, in response to the notice, displays a specific login screen on the display device 211 (step S181d). However, the customization application 25d may display the login screen at a specific timing ignoring the notice.

When authentication information is input via the login screen by the user (step S191d), the customization application 25d specifies the input authentication information and requires the request destination selection unit 244 to execute an authentication process (step S201d).

The request destination selection unit 244, based on the response that the process customization of the object customization information e is ON, requires the customization application 25e to execute the authentication process related to the authentication information (step S211e). The customization application 25e in response to the notice, executes a specific authentication process related to the authentication information (step S221e), and responds with a result of the authentication process to the request destination selection unit 244 (step S231e).

The request destination selection unit 244, based on the response that the screen authentication of the object customization information d is ON, gives notice of the result of the authentication process to the customization application 25d (step S241d). The customization application 25d executes a process according to the result of the authentication process. For example, when an authentication in the authentication process succeeds, the customization application 25d causes the specific login screen to vanish (step S251d). As a result, for example, an operation of the home screen displayed under the login screen becomes possible.

The fourth customization is preferable in the case where customization for the screen transition control unit 241 and customization for the process control unit 242 are performed by software vendors which are different from each other.

Meanwhile, in the case where plural pieces of customization information for one customization function name interfere with each other, each of the pieces of customization information may be ignored, or any one of the pieces of customization information may be employed. The interference of pieces of customization information with each other means that for one customization function name values of screen customizations of two or more pieces of customization information are ON, or values of process customizations of two or more pieces of customization information are ON.

Moreover, some OS 21 can cause a layer for displaying a screen to be selected from plural layers. In the case where screens are superimposed, a vertical relationship for the screens follows the vertical relationship for the layers. The layer of the screen that the customization application 25 causes to be displayed is a lower level than the layer of the screen that notifies the user of an important item such as an error or an alert, and may be displayed on a screen of a layer which is higher than the layer of the screen of the default applications, such as the authentication application 24.

As described above, the request destination selection unit 244 according to the present embodiment determines whether the default application is called or the customized application 25 is called according to values of the screen customization and the process customization of the customization information. Accordingly, each of the customization application 25 can implement any one of the screen customizations and the process customizations. That is, each of the customization application 25 is not necessary to replace completely the default application which is an object for customization. Accordingly, independency of a change in a process of a display screen and a change in a process according to an input to the screen in a program can be enhanced. As a result, the efficiency in customizing default applications can be improved.

Meanwhile, in the present embodiment, the information processing system 1 or the information processing terminal 20 is an example of an information processing device. The screen transition control unit 241 is an example of a display control unit. The function name is an example of first identification information. The customization information storage unit 26 is an example of a storage unit. The application name is an example of second identification information. The request destination selection unit 244 is an example of a request unit.

Although the present invention has been described with reference to embodiments, the present invention is not limited to these embodiments, but various variations and modifications may be made without departing from the scope of the invention as set forth in the accompanying claims.

The present application is based on and claims the benefit of priority of Japanese Priority Application No. 2013-255641 filed on Dec. 11, 2013, the entire contents of which are hereby incorporated by reference.

DESCRIPTION OF THE REFERENCE NUMERALS 1 information processing system
10 image forming apparatus
11 controller
12 scanner
13 printer
14 modem
15 terminal interface
16 network interface
17 SD card slot
20 information processing terminal
21 OS
22 platform layer
23 application layer
24 authentication application
25, 25a, 25b, 25c, 25d, 25e customization application
26 customization information storage unit
80 SD card
111 CPU
112 RAM
113 ROM
114 HDD
115 NVRAM
121 device API
122 device control unit
201 CPU
202 memory
203 auxiliary storage device
204 touch panel
205 wireless communication device
206 device interface
211 display device
212 input device
241 screen transition control unit
242 process control unit
243 customization information management unit
244 request destination selection unit
511 initial screen
512 IC card screen
531 login screen

The invention claimed is:

1. An information processing method that an information processing apparatus executing:
   a storage step of storing in a storage unit, associating with first identification information of a first program, which causes the information processing apparatus to function as a display control unit that displays a screen and to function as a process control unit that executes a process according to an input to the screen, information indicating whether there is a change in the screen and whether there is a change in the process; and
   a request step of
      executing an authentication application that authenticates a user, which causes the processor to display a login screen to which authentication information is input and execute an authentication process according to the authentication information input to the login screen,
      requiring, in a case where the information which the storage unit stores indicates that there is a change in the screen, a second program, which is related to second identification information associated with the first identification information and stored in the storage unit, to display a changed screen, and requiring, in a case where the information which the storage unit stores indicates that there is a change in the process, a third program, which is related to third identification information associated with the first identification information and stored in the storage unit, to execute a changed process, and determining whether a customizable default application is called or a customized application from among a plurality of customization applications is called according to values of a screen customization and a process customization of customization information, the customized application being an application that changes a part of the customizable default application, wherein the storage step further includes storing second information indicating at least whether there is a change in the login screen and whether there is a change in the authentication process in association with a function name of the authentication application, and in a case where the stored second information indicates that there is a change in the authentication process, the processor executes a second customization application from among a plurality of customization applications, which is related to a second application name associated with the function name and stored in the memory, to execute a changed authentication process, in which the changed authentication process determines whether a duration from a previous login of the user exceeds a predetermined threshold duration and displays a secondary authentication screen for authenticating the user in a case where the duration from the previous login of the user exceeds the predetermined threshold, and each of the customization applications can implement any one of the screen customizations and the process customizations, such that the customized application does not completely replace the customizable default application.

2. A non-transitory computer-readable storage medium storing a program for causing a computer to perform a process in an information processing apparatus, the process comprising:

a storage step of storing in a storage unit, associating with first identification information of a first program, which causes the information processing apparatus to function as a display control unit that displays a screen and to function as a process control unit that executes a process according to an input to the screen, information indicating whether there is a change in the screen and whether there is a change in the process; and a request step of executing an authentication application that authenticates a user, which causes the processor to display a login screen to which authentication information is input and execute an authentication process according to the authentication information input to the login screen, requiring, in a case where the information which the storage unit stores indicates that there is a change in the screen, a second program, which is related to second identification information associated with the first identification information and stored in the storage unit, to display a changed screen, and requiring, in a case where the information which the storage unit stores indicates that there is a change in the process, a third program, which is related to third identification information associated with the first identification information and stored in the storage unit, to execute a changed process, and determining whether a customizable default application is called or a customized application from among a plurality of customization applications is called according to values of a screen customization and a process customization of customization information, the customized application being an application that changes a part of the customizable default application, wherein the storage step further includes storing second information indicating at least whether there is a change in the login screen and whether there is a change in the authentication process in association with a function name of the authentication application, and in a case where the stored second information indicates that there is a change in the authentication process, the processor executes a second customization application from among a plurality of customization applications, which is related to a second application name associated with the function name and stored in the memory, to execute a changed authentication process, in which the changed authentication process determines whether a duration from a previous login of the user exceeds a predetermined threshold duration and displays a secondary authentication screen for authenticating the user in a case where the duration from the previous login of the user exceeds the predetermined threshold, each of the customization applications can implement any one of the screen customizations and the process customizations, such that the customized application does not completely replace the customizable default application.

3. An information processing apparatus comprising:

a processor; and a memory that stores a first program that causes the processor to display a screen, execute a process according to an input to the screen, wherein the memory further stores information indicating whether there is a change in the screen and whether there is a change in the process in association with first identification information that identifies the first program, an authentication application for performing authentication, wherein execution of the authentication application causes the processor to display a login screen to which authentication information is input and execute an authentication process according to the authentication information input to the login screen, a second program that causes the processor to display a changed screen in a case where the stored information indicates that there is a change in the screen, the second program being related to second identification information that is associated with the first identification information and stored in the memory, and a third program that causes the processor to execute a changed process in a case where the stored information indicates that there is a change in the process, the third program being related to third identification information that is associated with the first identification information and stored in the memory, and wherein the memory further stores second information indicating at least whether there is a change in the login screen and whether there is a change in the authentication process in association with a function name of the authentication application, and in a case where the stored second information indicates that there is a change in the authentication process, the processor executes a second customization application from among a plurality of customization applications, which is related to a second application name associated with the function name and stored in the memory, to execute a changed authentication process, in which the changed authentication process determines whether a duration from a previous login of the user exceeds a predetermined threshold duration and displays a secondary authentication screen for authenticating the user in a case where the duration from the previous login of the user exceeds the predetermined threshold, the processor determines whether a customizable default application is called or a customized application from among a plurality of customization applications is called according to values of a screen customization and a process customization of customization information, the customized application being an application that changes a part of the customizable default application, and each of the customization applications can implement any one of the screen customizations and the process customizations, such that the customized application does not completely replace the customizable default application.

4. The information processing apparatus as claimed in claim 3, wherein in a case where the stored information indicates that there is the change in the screen, the processor controls further displaying of the screen through the second program.

5. The information processing apparatus as claimed in claim 3, wherein in a case where the stored information indicates that there is the change in the process, the processor controls further execution of the process through the third program.

6. The information processing apparatus as claimed in claim 3, wherein the processor receives information input to the screen that a display control unit or the second program causes to display, and gives notice of the input information to the processor or the third program based on the stored information.

7. The information processing apparatus as claimed in claim 3, wherein in a case where the stored second information indicates that there is a change in the login screen, the processor executes a first customization application from among a plurality of customization applications, which is related to a first application name associated with the function name and stored in the memory, to display a changed login screen.

8. The information processing apparatus as claimed in claim 3, wherein in a case where the stored information includes a first customization information associated with the second program that indicates there is a change in the screen without a changing the process and a second customization information associated with the third program that indicates there is a change in the process without changing the screen, the processor first executes the second program to display the changed screen and then executes the third program to execute the changed process, based on the input to the changed screen displayed by the second program.

* * * * *